US008517580B2

(12) United States Patent
Keilig

(10) Patent No.: US 8,517,580 B2
(45) Date of Patent: Aug. 27, 2013

(54) HEADLIGHT FOR A MOTOR VEHICLE HAVING A MASKING APPARATUS

(75) Inventor: Ralf Keilig, Langewiesen (DE)

(73) Assignees: Hella KGaA Hueck & Co., Lippstadt (DE); Technische Universität Ilmenau, Ilmenau (DE)

( * ) Notice: Subject to any disclaimer, the term of this patent is extended or adjusted under 35 U.S.C. 154(b) by 947 days.

(21) Appl. No.: 12/605,310

(22) Filed: Oct. 23, 2009

(65) Prior Publication Data

US 2010/0103690 A1 Apr. 29, 2010

(30) Foreign Application Priority Data

Oct. 23, 2008 (EP) .................................... 08167452

(51) Int. Cl.
*B60Q 1/076* (2006.01)
*F21V 17/02* (2006.01)

(52) U.S. Cl.
USPC ........... 362/513; 362/507; 362/467; 362/526; 362/286; 362/386; 362/398

(58) Field of Classification Search
None
See application file for complete search history.

(56) References Cited

FOREIGN PATENT DOCUMENTS

| | | | |
|---|---|---|---|
| DE | 1909023 | A1 | 2/1969 |
| DE | 2320908 | A1 | 11/1974 |
| EP | 0862015 | B1 | 2/1998 |
| EP | 1128125 | B1 | 2/2001 |
| EP | 1424241 | A2 | 11/2003 |
| EP | 1798468 | A2 | 12/2006 |
| GB | 1247687 | A | 2/1968 |

OTHER PUBLICATIONS

European Search Report, Mailing date Mar. 24, 2009, for corresponding European Application No. EP 08 16 7452.

*Primary Examiner* — Ashok Patel
(74) *Attorney, Agent, or Firm* — Intellectual Property Law Group LLP

(57) ABSTRACT

The present invention relates to a headlight for a motor vehicle having a light source, which is arranged in a reflector, for emission of light beams in a light outlet direction, having a masking apparatus (1) which has a mask (2) which can be moved to a first position in order to mask out at least a portion of the light beams, and which can be moved to a second position in which the mask (2) is moved at least partially out of the light beams, wherein the movement of the mask (2) can be produced by an actuator unit (3) which has at least one magnet coil (4) and a magnet yoke (5) in order to form a magnetic flux circuit. According to the invention, a hinged armature (6) is provided, is held in an articulated manner on at least a part of the magnet yoke (5) and is in the form of part of the mask (2), such that the hinged armature (6) carries out a folding movement, and produces the movement of the mask (2), when current is passed through the magnet coil (4).

11 Claims, 4 Drawing Sheets

DETAIL V

HEADLIGHT FOR A MOTOR VEHICLE HAVING A MASKING APPARATUS

BACKGROUND OF THE INVENTION

Field of Invention

The present invention relates to a headlight for a motor vehicle having a light source, which is arranged in a reflector, for emission of light beams in a light outlet direction. The headlight has a masking apparatus which has a mask which can be moved to a first position and can represent a dimmed light position, in order to mask out at least a portion of the light beams, and which can be moved to a second position, which can represent a main beam position and in which the mask is moved at least partially out of the light beams, wherein the movement of the mask can be produced by an actuator unit which has at least one magnet coil and a magnet yoke in order to form a magnetic flux circuit.

DE 199 33 415 A1 discloses a headlight for a motor vehicle having a light source, which is arranged in a reflector, for emission of light beams in a light outlet direction. The headlight has a masking apparatus with a mask which can be moved between a first position and a second position. The mask is moved by means of an actuator unit which has a magnet coil and a magnet yoke in order to form a magnetic flux circuit. An armature plate is arranged on the mask and can enter the magnet coil, wherein the mask and the armature plate can rotate about a rotation shaft which runs transversely with respect to the light outlet direction.

The masking apparatus has a mount body on which the rotation shaft is fitted in a fixed position. Since the armature plate is in the form of a plunger-type armature in order to enter the magnet coil, this results in an arrangement which requires a large amount of physical space. In particular, the required pivoting angle must be very large, as a result of which the magnet coil must have a considerable depth which the armature plate enters. This impedes highly dynamic and fast switching between a dimmed light and main beam. The required physical space is also enlarged because of the large pivoting angle of the mask and the separate arrangement of the magnet coil from the mount body.

A further disadvantage results from large gaps between the components which are involved in the formation of the magnetic flux circuit. The larger the gaps which have to be bridged by the magnetic flux, the lower is the efficiency of the electromechanical coupling. In order to increase the efficiency, the gap sizes between the components involved in the magnetic flux circuit must be as small as possible. It is particularly necessary to provide small gap sizes between a stationary component and a moving component within the magnetic flux circuit. If the armature plate is mounted on a first rotation shaft and if the magnet coil is held on a further component at a distance from the rotation shaft of the armature plate, small gap sizes can be achieved only with a very high degree of technical complexity. In consequence, known magnet coils must be designed to be larger, in order to ensure reliable switching of the mask between a dimmed light position and a main beam position.

SUMMARY OF THE INVENTION

The object of the present invention is therefore to provide a headlight for a motor vehicle having a masking apparatus which overcomes the disadvantages of the abovementioned prior art, has a physically small actuator unit, and allows rapid switching of the mask between the dimmed light position and the main beam position.

Against the background of a headlight for a motor vehicle having a masking apparatus as claimed in the precharacterizing clause of Claim 1, this object is achieved in conjunction with the characterizing features. Advantageous developments of the invention are specified in the dependent claims.

The invention includes the technical teaching that a hinged armature is provided, which is held in an articulated manner on at least a part of the magnet yoke and is in the form of part of the mask, such that the hinged armature carries out a folding movement, and produces the movement of the mask, when current is passed through the magnet coil.

The arrangement according to the invention of a hinged armature achieves the advantage that the hinged armature has to travel over only short distances in order to pivot the mask between the dimmed light position and the main beam position. The hinged armature is held in an articulated manner on a part of the magnet yoke in such a way that it can flap to and fro between two limit positions. The folding movement of the hinged armature can be produced by current being passed through the magnet coil, in which case the entire mask follows the folding movement of the hinged armature, since this is in the form of part of the mask. In the present case, the mask describes the entire unit which is moved between the main beam position and the dimmed light position. In consequence, the hinged armature need not represent a part of the mask which is actually moved into the light beams emitted from the light source. This results in the advantage that the hinged armature can have smaller dimensions than the part of the mask which is moved into the light beam. This lever effect allows small movements of the hinged armature to produce large movements of the entire mask.

Furthermore, a magnet core extends at least partially through the magnet coil in such a way that, when current is passed through the magnet coil, the hinged armature is drawn against and/or in the direction of the magnet core and the hinged armature becomes a component of the magnetic flux circuit. The magnetic flux circuit comprises at least the magnet yoke, which can be bent in an L-shape, and the magnet core, wherein the magnet yoke and the magnet core form the stationary components of the magnetic flux circuit. The magnetic flux circuit is closed by the hinged armature, which represents the moving part of the magnetic flux circuit. An electromechanical actuator unit with high efficiency is created by providing a closed magnetic flux circuit without a plurality of gaps between the individual components. An arrangement with the magnetic flux circuit according to the invention makes it possible to design the actuator unit to be considerably smaller to produce the switching forces required to move the mask. In consequence, the activation currents that are required are reduced, as are the heat losses caused by the current flow through the actuator unit. A high actuator unit efficiency such as this can be achieved only by including a hinged armature in the magnetic flux circuit. When current is passed through the magnet coil, the hinged armature closes the magnetic flux circuit, as a result of which this magnetic flux circuit comprises at least the magnet yoke, the magnet core and the hinged armature. In this case, the hinged armature can most easily be drawn against the magnet core, as a result of which the hinged armature comes into contact with the end surface of the magnet core when current is passed through the magnet coil.

A further advantage is achieved in that the movement of the mask corresponds to a rotary movement about a hinge axis, wherein the hinge axis is arranged in the light outlet direction.

The rotary movement of the mask takes place about a hinge axis, with the mask having a mask arm which folds into a part of the light beam when the mask is pivoted to the dimmed light position. The mask arm has a longitudinal extent and, together with a mount body of the mask apparatus, forms that part of the mask apparatus which is located in the light beams. In order to pivot the mask arm into a part of the light beams, the hinge axis can be arranged either transversely with respect to the light outlet direction, or in the light outlet direction. If the hinge axis is arranged in the light outlet direction, this results in shorter movement distances for the hinged armature because of the coupling according to the invention of the hinged armature to the mask arm, with these distances being those which the hinged armature has to travel between the dimmed light position and the main beam position. The arrangement of the hinged armature according to the invention therefore has a hinge axis which runs parallel to the light outlet direction. In particular, the actuator can be arranged alongside the mount body, wherein the actuator unit can be arranged with the hinged armature on a first, front face of the mount body, wherein the mask arm is in the form of a plate in the form of a rod, which extends on a plane which extends on the side of the mount body opposite the actuator unit.

It is also advantageous that the articulated retention of the hinged armature on the magnet yoke is formed by a hinge arrangement, through which the magnetic flux passes between the magnet yoke and the hinged armature. The magnetic flux circuit passes through both the magnet yoke and the hinged armature. In order to ensure an undisturbed and uninterrupted magnetic flux, this likewise has to pass through the hinge arrangement. The hinge arrangement is therefore preferably composed of components which are magnetically permeable. Particularly preferably, the hinge arrangement can be formed directly by the hinged armature and the magnet yoke, in such a way that the hinged armature and the magnet yoke touch on the hinge axis. This results in magnetic coupling, and ensures that the magnetic flux circuit is closed despite the hinge arrangement between the hinged armature and the magnet yoke.

The mask may be formed from at least the mask arm and the hinged armature, wherein the hinged armature is in the form of a plate and extends on a plane at right angles to the extent plane of the mask arm of the mask. The mask arm extends on a plane at right angles in the light outlet direction, wherein the hinged armature has an extent plane which is formed on the one hand by the light outlet direction and on the other hand by the horizontal of the headlight in the installed state, wherein the hinged armature can depart slightly from the horizontal between the dimmed light position and the main beam position. In contrast, the mask arm extends in the vertical of the headlight in order to partially mask out the light which emerges approximately horizontally from the headlight.

A further advantage is achieved in that the mask has a compensating mass which is in the form of a plate and extends on a plane at right angles to the hinged armature and at right angles to the mask arm. In consequence, the compensating mass which is in the form of a plate, the mask arm and the hinged armature each form plates which are aligned at right angles to one another. However, the compensating mass may also assume any other geometric shape and need not be in the form of a plate. The compensating mass is used to compensate for the mass of the mask arm and of the hinged armature, such that the center of gravity of the mask lies on the hinge axis, in order to make the masking apparatus insensitive to external shock influences and accelerations. The compensating mass, the mask arm and the hinged armature may be formed integrally overall, or else at least two of the three components of the mask may be formed integrally, such that the third component is connected to the two other components by means of a connection method, or all three components of the mask may be in the form of individual parts, and may be connected to one another. The hinged armature can advantageously be produced from a material of high magnetic permeability, while in contrast the permeability of the mask arm and/or of the compensating mass need not be ensured, with these being composed of a lightweight material.

According to a further improved embodiment, a spring element is arranged between the magnet yoke and the hinged armature, is in the form of a spring clip and applies force to the hinged armature such that it is held in the folded position, which corresponds to the dimmed light position of the mask, when no current is passed through the magnet coil. The spring clip in this case describes a spring wire which is open on one side or a spring leaf which is C-shaped and is clamped in between an area of the magnet yoke and the hinged armature. The spring clip applies force to the hinged armature on that side of the hinge axis which corresponds to the averted side, on which the hinged armature interacts with the magnet core. If the hinged armature is prestressed in the direction of the magnet yoke in the rearward area behind the hinge axis, the hinged armature remains in the dimmed light position. When current is passed through the magnet coil, then the hinged armature is drawn in the direction of the magnet core, with the movement in the opposite direction to the prestressing of the spring element. This results in a monostable arrangement of the hinged armature, as a result of which it is moved from the dimmed light position to the main beam position only when current is passed through the magnet coil, and it remains in the dimmed light position when no current is passed through the magnet coil. The spring element may also be in the form of a tension spring which extends between the hinged armature and the magnet yoke. The tension spring may be held in a stamped-out or notched holding mandrel in the hinged armature, with the holding mandrel likewise being arranged on that side of the hinged armature relative to the hinge axis which corresponds to the averted side of the hinged armature in the interaction area of the magnet core.

A further improvement in the magnetic force acting on the hinged armature is achieved in that the magnet core has a widened area in the form of a plate with a cylindrical attachment which extends in the direction of the hinged armature from the magnet coil, wherein the hinged armature has a cutout into which the attachment extends. The cutout in the hinged armature at least partially surrounds the cylindrical attachment on the magnet core, and preferably also the section of a semicircle. The widened area of the magnet core, which is in the form of a plate, is located adjacent to the hinged armature when the latter has been pivoted to the dimmed light position. When current is passed through the magnet coil, then a magnetic flux through the widened area in the form of a plate can be amplified, and the hinged armature is attracted by the widened area in the form of a plate. This widens the area by means of which a magnetic flux is caused between the magnet core and the hinged armature. Further amplification of the magnetic force acting on the hinged armature is achieved by the arrangement of the cylindrical attachment, which extends into the cutout within the hinged armature. Since the cutout in the hinged armature at least partially surrounds the cylindrical attachment and forms only a small gap from the cylindrical attachment, the magnetic flux between the hinged armature and the magnet core is further enhanced via the small gap.

The hinge arrangement between the magnet yoke and the hinged armature may have a curved cutout in the connection area to the magnet yoke, in which a rolling surface of the hinged armature is held. The rolling surface rolls along the curved cutout during movement of the hinged armature, such that the gap which exists between the cylindrical attachment of the magnet core and the cutout of the hinged armature remains essentially unchanged over the movement of the hinged armature. In consequence, the magnetic force acting on the hinged armature assumes high values even when the hinged armature is still in the dimmed light position. In consequence, the hinge arrangement does not form a pure rotary joint, but the rotary movement of the hinged armature has superimposed on it a rolling movement of the rolling surface of the hinged armature within the curved cutout. The actual rotation point of the hinged armature relative to the magnet yoke is in consequence not located at the contact point between the rolling surface and the curved cutout, but may be arranged a long distance away from the contact point. The curved shape of the cutout is designed such that the gap between the attachment on the magnet core and the cutout in the hinged armature remains essentially the same throughout the entire movement path of the hinged armature. The gap may have a value of 0.05 mm to 0.3 mm, preferably a value of 0.1 mm to 0.25 mm, and particularly preferably a value of 0.18 mm.

A further embodiment of the masking apparatus may comprise an opposing armature which is located in the magnetic flux of the actuator unit. The opposing armature may be seated on the end of the magnet core on the hinged armature side, and has a force flow edge which extends parallel to an opposing edge which is formed on the hinged armature. The force flow edge and the opposing edge run parallel to one another and once again extend parallel to the hinge axis. This results in a further embodiment in order to form a small gap between the hinged armature and the magnet core, which is formed on the hinged armature on the one side and on the opposing armature on the other side, by the respective edges. The opposing armature may be in the form of a planar body and extends on a plane which is at right angles to the magnet coil, wherein a holding carriage may be provided, which holds the opposing armature such that it cannot move and on which the hinged armature is arranged via a hinge arrangement, such that it can move. The hinge arrangement may correspond to the hinge arrangement described above, which does not form a pure rotary hinge but is in the form of a superimposition of a rotary movement and a swinging movement. In consequence, the small gap between the force flow edge of the opposing armature and the opposing edge of the hinged armature is also essentially constant over the entire movement of the hinged armature, according to this embodiment.

Further measures which improve the invention will be explained in more detail in the following text, together with the description of one preferred exemplary embodiment of the invention, on the basis of the figures, in which:

DETAILED DESCRIPTION OF SPECIFIC EMBODIMENTS

Figure 1:
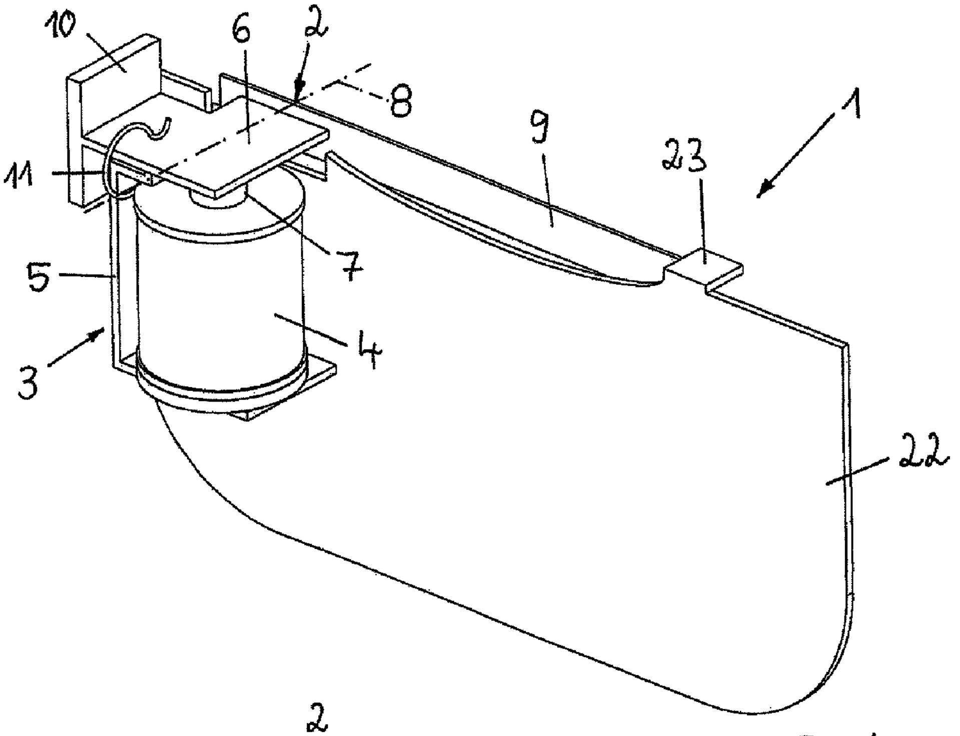
FIG. 1 shows a perspective view of one exemplary embodiment of a masking apparatus for a headlight for a motor vehicle, according to the present invention, wherein the masking apparatus has a mask which is illustrated in the dimmed light position.

FIG. 1 shows the perspective illustration of a masking apparatus 1 as is used in headlights for motor vehicles. The masking apparatus 1 is inserted in the reflector of the headlight and is used to mask out a portion of the light beams which are emitted by a light source which is accommodated in the reflector. The masking apparatus 1 first of all comprises a base part which is formed by a mount body 22 and via which the masking apparatus 1 is inserted in the reflector or in the light module of the headlight for the motor vehicle. The masking apparatus 1 has a mask 2 which has a plurality of components. One major component of the mask 2 is the mask arm 9 which extends plane-parallel to the mount body 22 and masks out that portion of the light beams in the light outlet direction which corresponds to the difference between the dimmed light and the main beam of the headlight. According to the illustration, the mask arm 9 is illustrated in the dimmed light position, since this extends beyond the mount body 22 and comes into contact with a mask arm stop 23. In the illustrated dimmed light position, the actuator unit 3 is not activated. The actuator unit 3 comprises at least one magnet coil 4, a magnet yoke 5 and a magnet core 7.

According to the invention, in addition to the mask arm 9, the mask 2 has a hinged armature 6 which is held in an articulated manner on the magnet yoke 5. The hinged connection comprises a hinge axis 8 which is aligned parallel to the light outlet direction. When current is passed through the magnet coil 4 of the actuator unit 3, then the hinged armature 6 is drawn in the direction of the magnet core 7. In consequence, the mask 2 comprising at least the hinged armature 6 and the mask arm 9, can be moved to the main beam position. A spring clip 11 is provided in order to hold the mask 2 in the illustrated dimmed light position when no current is being passed through the magnet coil 4, and prestresses the mask 2 such that it remains in the dimmed light position for as long as no current is passed through the magnet coil 4 of the actuator unit 3. In order to place the center of gravity of the mask 2 essentially on the hinge axis 8, a compensating mass 10 is provided, which is likewise a component of the mask 2.

In consequence, the mask 2 comprises at least the mask arm 9, the hinged armature 6 and the compensating mass 10. The mask arm 9 extends on a first vertical plane at right angles to the light outlet direction, with the compensating mask 10 being in the form of a plate and extending on a further vertical plane, which is arranged at right angles to the plane on which the mask arm 9 extends. The hinged armature 6 extends on a plane which is arranged approximately horizontally, as a result of which the extent planes of the hinged armature 6, of the mask arm 9 and of the compensating mass 10 are each arranged at right angles to one another.

Figure 2:
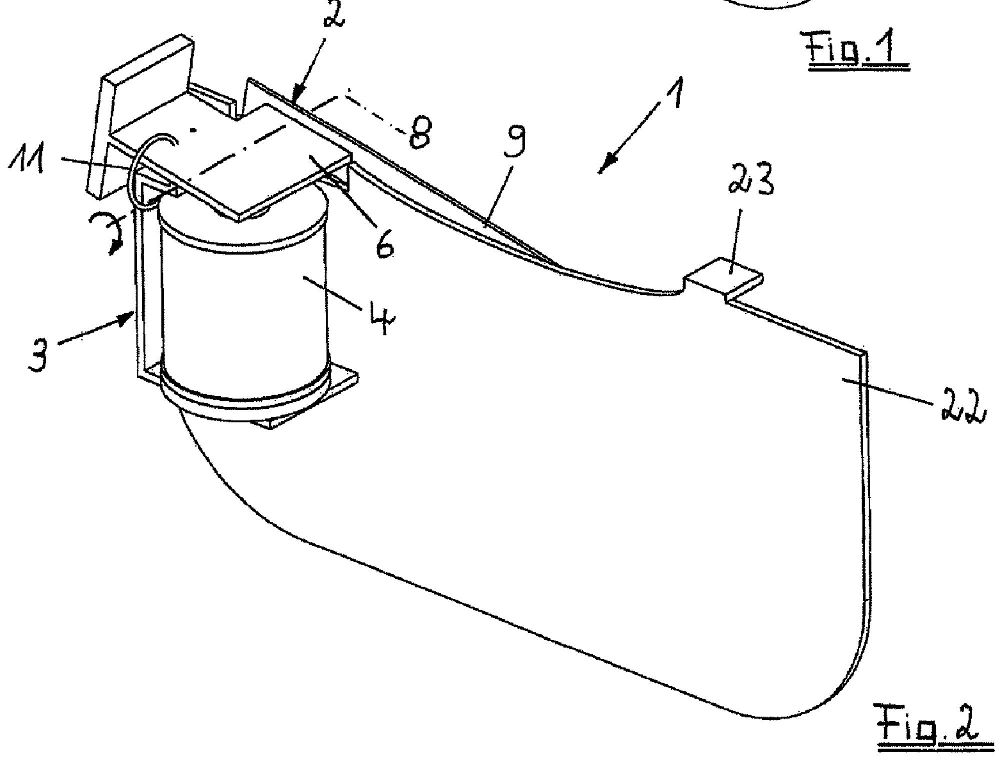
FIG. 2 shows the masking apparatus as shown in FIG. 1, with the mask being illustrated in the main beam position.

FIG. 2 shows the masking apparatus 1 with the mask 2 in the main beam position. The latter is folded downward in a movement parallel to the extent plane of the mount body 2, by passing current through the magnet coil 4 of the actuator unit 3. The folding movement of the hinged armature 6 takes place against the prestressing force of the spring clip 11, with the mask 2 carrying out a folding movement about the hinge axis 8. In consequence, the mask arm 9 is pivoted from the stop position by the mask arm stop 23. The light beams emitted from the light source can now pass through the area which was shadowed by the mask arm 9 in the dimmed light position, and the headlight emits a main beam.

Figure 3:
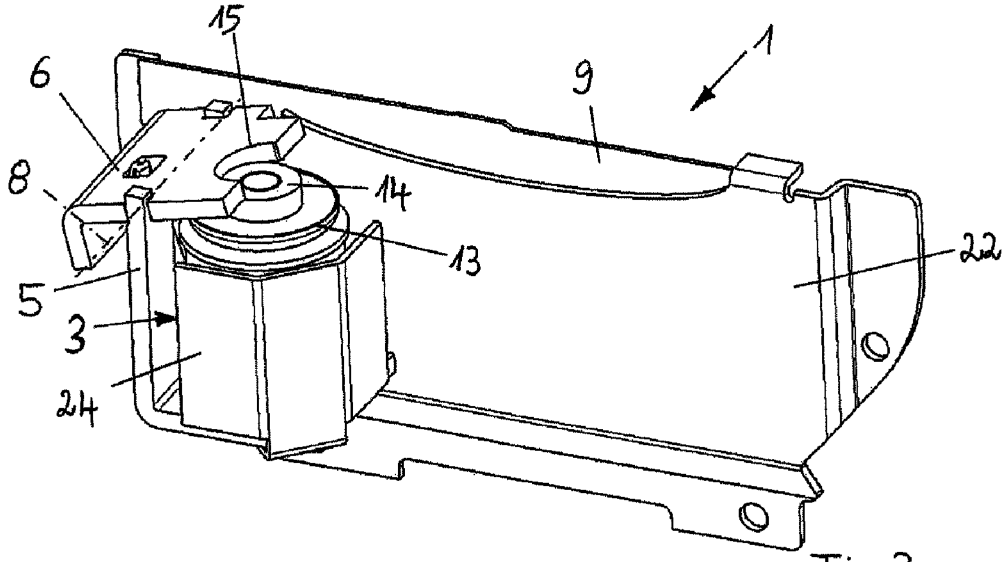
FIG. 3 shows a perspective view of a further exemplary embodiment of the masking apparatus according to the invention, with a modified embodiment of the hinged armature and of the magnet core of the actuator unit.

FIG. 3 shows a further exemplary embodiment of the masking apparatus 1 with a modified actuator unit 3 and a modified geometry of the hinged armature 6. The illustration shows the mask arm 9 and the hinged armature 6 in the dimmed light position, with the hinged armature 6 being connected to the mask arm 9, although this connection is not shown in any more detail in the illustration. The hinged armature 6 has a cutout 15 through which a cylindrical attachment on the magnet core at least partially extends, and this cylindrical attachment is held in the magnet coil. Furthermore, in addition to the cylindrical step, the actuator unit 3 has a widened area 13 in the form of a plate, which is arranged at least partially under the hinged armature 6. When the actuator unit 3 is activated by passing current through the magnet coil, then the hinged armature 6 is attracted by the widened area 13, which is in the form of a plate, and by the cylindrical attachment 14. In consequence, the magnetic flux passes through the magnet yoke 5 as well as the hinged armature 6, the widened area 13 in the form of a plate, and the cylindrical attachment 14. The hinged armature 6 is arranged in an articulated manner about the hinge axis 8 and is held via the magnet yoke 5. The arrangement according to the invention results in a closed magnetic flux circuit. The arrangement of the cylindrical attachment 14 and of the widened area 13 in the form of a plate within the cutout 15 in the hinged armature 6 results in the advantage that there is a small gap between the cylindrical attachment 14 and the cutout 15 in the hinged armature 6, which gap does not change, or changes only insignificantly, during the folding movement of the hinged armature 6. In consequence, the electromechanical effect of the actuator unit 3 is improved. Cladding 24 is illustrated in front of the actuator unit 3 which can be attached to the mount body 22 or to the magnet yoke 5, and can represent a further contribution to the closing of the magnetic flux circuit.

Figure 4:
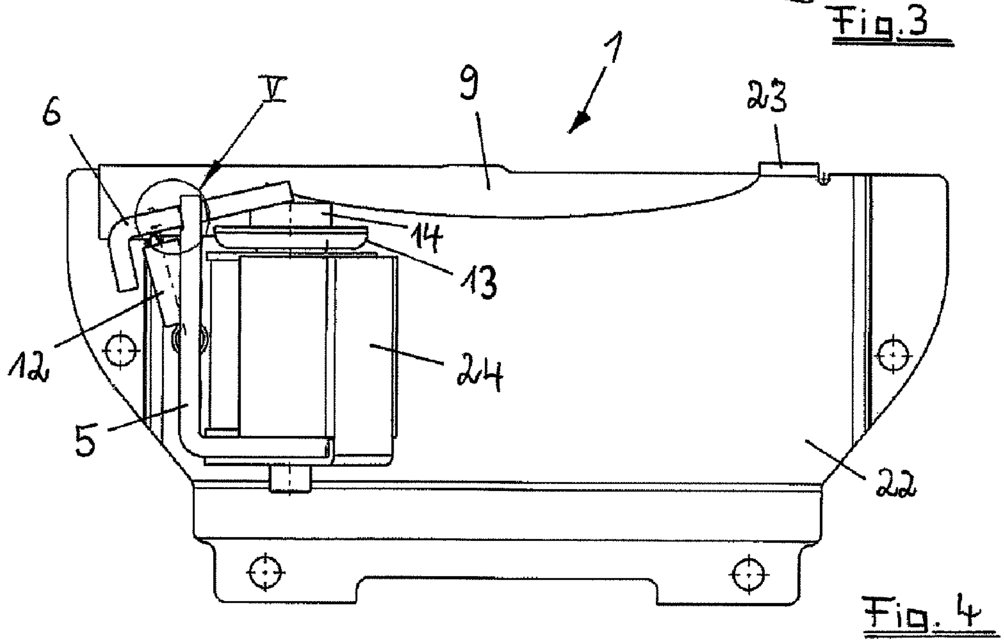
FIG. 4 shows an isometric illustration of the exemplary embodiment shown in FIG. 3.

FIG. 4 shows an isometric illustration of the exemplary embodiment shown in FIG. 3. In this figure, the spring element is in the form of a tension spring 12 which extends between the hinged armature 6 and the magnet yoke 5. The tension spring 12 is in the form of a spiral spring and is linked on the lower side of the hinged armature 6 thereto. The masking apparatus 1 is likewise illustrated in the dimmed light position of the mask arm 9, such that this comes into contact with the mask arm stop 23 of the mount body 22. Cladding 24 is once again shown in front of the actuator unit, and is screwed to the magnet yoke 5. The hinge connection between the hinged armature 6 and the magnet yoke 5 is illustrated in more detail by a detail V, which is described in more detail in the next figure, FIG. 5.

Figure 5:
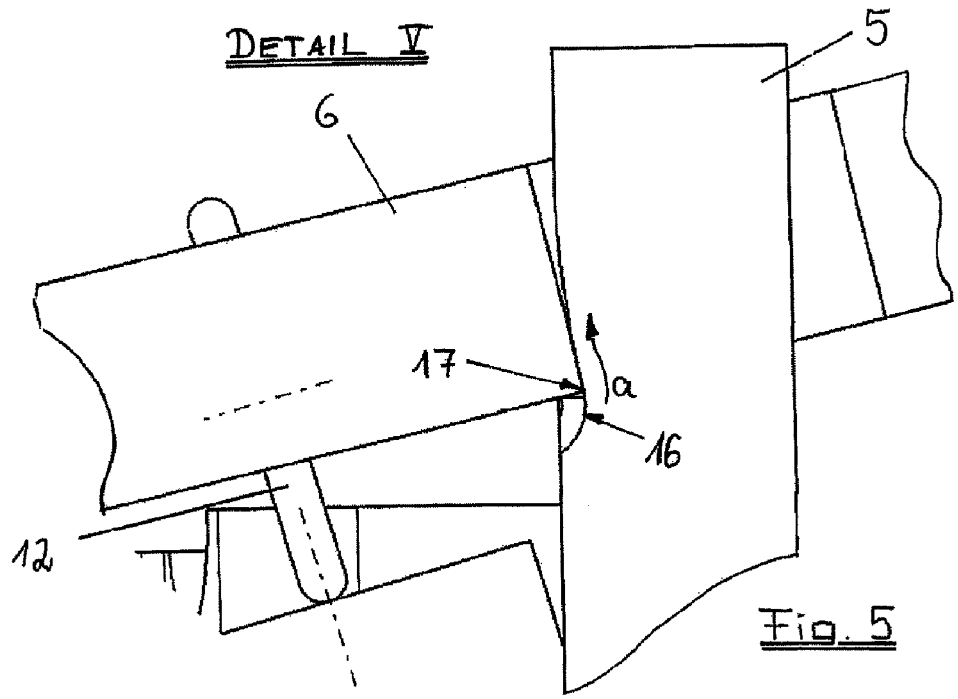
FIG. 5 shows the illustration of the detail V as shown in FIG. 4, which shows one exemplary embodiment, according to the invention, of the hinge arrangement between the hinged armature and the magnet yoke.

FIG. 5 shows an exemplary embodiment of the detail V, which shows the hinge arrangement between the hinged armature 6 and the magnet yoke 5 in more detail. A curved cutout 16 is incorporated in the magnet yoke 5 and forms the connection area to the hinged armature 6. The hinged armature 6 has a rolling surface 17 which rolls along the curved cutout 16 during movement of the hinged armature 6. The rolling movement runs along a rolling contact path a, which is represented by an arrow in the illustration. According to the illustration, the hinged armature 6 is in the dimmed light position, as a result of which the rolling surface 17 moves along the curved cutout 16 when the hinged armature 6 is moved to the main beam position. The tension spring 12 is also illustrated, which prestresses the hinged armature 6 in the illustrated dimmed light position.

Figure 6:
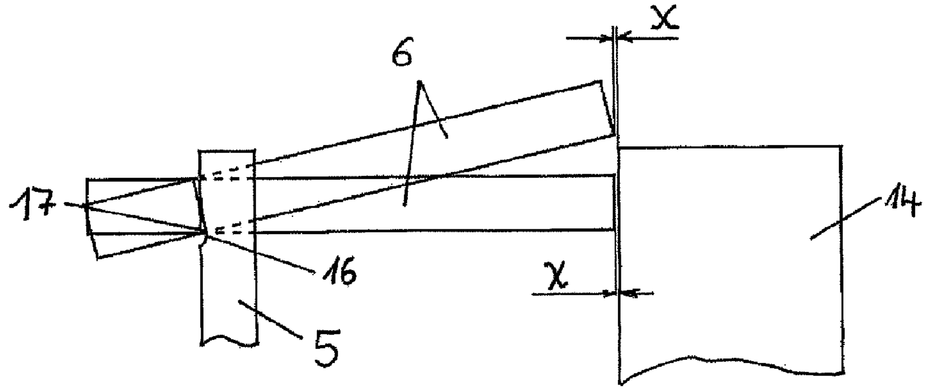
FIG. 6 shows an illustration of the hinged armature both in the dimmed light position and in the main beam position, with the hinged armature being fitted to the magnet yoke via the hinge arrangement according to the invention.

FIG. 6 shows a schematic illustration of the gap X which exists between the hinged armature 6 and the cylindrical attachment 14 and does not change during the movement of the hinged armature 6 between the dimmed light position and the main beam position. The view furthermore shows the curved recess 16 in the magnet yoke 5 and the rolling surface 17 of the hinged armature 6. This clearly shows that the curved cutout 16 can be geometrically shaped such that the gap X between the hinged armature 6 and the cylindrical attachment 14 does not change, since the hinged armature 6 carries out a superimposed rotary/rolling movement relative to the magnet yoke 5, which can also be referred to as a swinging movement of the rolling surface 17 within the cutout 16.

Figure 7:
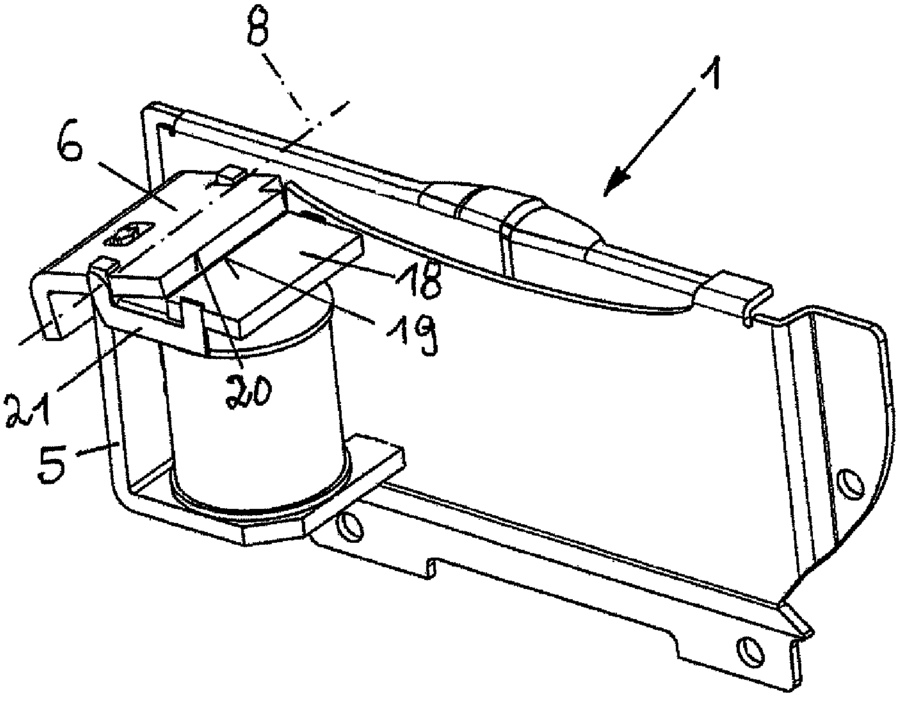
FIG. 7 shows a further exemplary embodiment of the masking apparatus according to the invention, with a further geometric embodiment of the hinged armature and of the arrangement of an opposing armature as a component of the magnetic force flow.

FIG. 7 shows a further exemplary embodiment of the masking apparatus 1 with a hinged armature 6 which is in the form of a plate and is held in a holding carriage 21 such that it can rotate about a hinge axis 8. The way in which the hinged armature 6 is held in the holding carriage 21 may correspond to the same embodiment as has already been shown in FIG. 5. Furthermore, an opposing armature 18 with magnetic permeability is held on the holding carriage 21, opposite the hinged armature 6. The opposing armature 18 is magnetically connected to the magnet core of the actuator unit, in such a way that it is possible to close the magnetic flux circuit through the magnet core, the magnet yoke 5, the hinged armature 6 and the opposing armature 18. In order to minimize the gap dimensions between the components of the magnetic flux circuit, and to achieve as great a magnetic flux as possible between the components, the opposing armature 18 has a force flow edge 19 which is arranged parallel to an opposing edge 20 which is formed on the hinged armature 6. A gap is once again formed between the force flow edge 19 and the opposing edge 20, which gap is very small and can likewise remain essentially the same during the folding movement of the hinged armature 6 between the dimmed light position and the main beam position.

The implementation of the invention is not restricted to the preferred exemplary embodiment described above. In fact, a number of variants are feasible, which make use of the illustrated solution for embodiments of a fundamentally different type, as well.

LIST OF REFERENCE SYMBOLS

1 Masking apparatus
2 Mask
3 Actuator unit
4 Magnet coil
5 Magnet yoke
6 Hinged armature
7 Magnet core
8 Hinge axis
9 Mask arm

10 Compensating mass
11 Spring clip
12 Tension spring
13 Widened area in the form of a plate
14 Cylindrical attachment
15 Cutout
16 Curved cutout
17 Rolling surface
18 Opposing armature
19 Force flow edge
20 Opposing edge
21 Holding carriage
22 Mount body
23 Mask arm stop
24 Cladding
X Gap
a Rolling contact path

I claim:

1. A headlight for a motor vehicle having a light source, which is arranged in a reflector, for emission of light beams in a light outlet direction, the headlight comprising:

a masking apparatus which has a mask which is movable to a first position in order to mask out at least a portion of the light beams, and which is movable to a second position in which the mask is moved at least partially out of the light beams, an actuator unit for producing the movement of the mask, which has at least one magnet coil and a magnet yoke in order to form a magnetic flux circuit, a hinged armature retained in an articulated manner on at least a part of the magnet yoke and is in the form of part of the mask, such that the hinged armature carries out a folding movement, and produces the movement of the mask, when current is passed through the magnet coil, a magnet core that extends at least partially through the magnet coil, wherein, when current is passed through the magnet coil, the hinged armature is drawn against and/or in the direction of the magnet core and the hinged armature becomes a component of the magnetic flux circuit, and an opposing armature, which is located in the magnetic flux, is seated on the end of the magnet core on the hinged armature side and has a force flow edge which extends parallel to an opposing edge which is formed on the hinged armature.

2. The headlight according to claim 1, wherein the movement of the mask corresponds to a rotary movement about a hinge axis, wherein the hinge axis is arranged in the light outlet direction, and wherein the first position of the mask is a dimmed light position, and the second position of the mask is a main beam position.

3. The headlight according to claim 2, wherein the articulated retention of the hinged armature on the magnet yoke is formed by a hinge arrangement, through which the magnetic flux passes between the magnet yoke and the hinged armature.

4. The headlight according to claim 1, wherein the articulated retention of the hinged armature on the magnet yoke is formed by a hinge arrangement, through which the magnetic flux passes between the magnet yoke and the hinged armature.

5. The headlight according to claim 1, wherein the mask is formed from at least one mask arm and the hinged armature, wherein the hinged armature is in the form of a plate and extends on a plane at right angles to the extent plane of the mask arm of the mask.

6. The headlight according to claim 5, wherein the mask has a compensating mass which is in the form of a plate and extends on a plane at right angles to the hinged armature and at right angles to the mask arm.

7. The headlight according to claim 1 further comprising a spring element arranged between the magnet yoke and the hinged armature, the spring element is in the form of a spring clip and applies force to the hinged armature such that it is held in a folded position, which corresponds to a dimmed light position of the mask, when no current is passed through the magnet coil.

8. The headlight according to claim 1, further comprising a spring element in the form of a tension spring or a compression spring, and extends between the hinged armature and the magnet yoke.

9. The headlight according to claim 1, wherein the magnet core has a widened area in the form of a plate with a cylindrical attachment which extends in the direction of the hinged armature from the magnet coil, wherein the hinged armature has a cutout into which the cylindrical attachment extends.

10. The headlight according to claim 9, wherein a hinge arrangement between the magnet yoke and the hinged armature has a curved cutout in the connection area to the magnet yoke, in which a rolling surface of the hinged armature is held, which rolls along the curved cutout during movement of the hinged armature, such that a gap which exists between the cylindrical attachment of the magnet core and the cutout of the hinged armature remains essentially unchanged over the movement of the hinged armature.

11. The headlight according to claim 1, wherein the opposing armature is in the form of a planar body and extends on a plane which extends at right angles to the magnet coil, wherein a holding carriage is provided, which holds the opposing armature such that it cannot move and on which the hinged armature is arranged via a hinge arrangement, such that it can move.

* * * * *